US011438458B1

(12) United States Patent
Gopalan et al.

(10) Patent No.: US 11,438,458 B1
(45) Date of Patent: Sep. 6, 2022

(54) SYSTEM AND METHOD FOR IMPROVEMENTS TO PRE-PROCESSING OF DATA FOR FORECASTING

(71) Applicant: Genesys Cloud Services, Inc., Daly City, CA (US)

(72) Inventors: Chitra Gopalan, Hyderabad (IN); Stefan Brinton, Indianapolis, IN (US); Vikas Srivastava, Hyderabad (IN); Charles D. Fico, Daly City, CA (US)

(73) Assignee: Genesys Cloud Services, Inc., Daly City, CA (US)

( * ) Notice: Subject to any disclaimer, the term of this patent is extended or adjusted under 35 U.S.C. 154(b) by 0 days.

(21) Appl. No.: 17/474,791

(22) Filed: Sep. 14, 2021

(51) Int. Cl.
  *H04M 3/51* (2006.01)
  *H04L 67/10* (2022.01)

(52) U.S. Cl.
  CPC ....... *H04M 3/5175* (2013.01); *H04M 3/5183* (2013.01); *H04L 67/10* (2013.01)

(58) Field of Classification Search
  None
  See application file for complete search history.

(56) References Cited

U.S. PATENT DOCUMENTS

| 2002/0184069 A1* | 12/2002 | Kosiba | H04M 3/50 705/7.38 |
| 2015/0381807 A1* | 12/2015 | Konig | G06Q 10/063112 379/265.06 |
| 2016/0105559 A1* | 4/2016 | Ragnet | H04M 3/5175 379/265.06 |
| 2018/0053401 A1* | 2/2018 | Martin | H04L 12/1895 |
| 2021/0329124 A1* | 10/2021 | Li | G06N 20/00 |

\* cited by examiner

*Primary Examiner* — Harry S Hong
(74) *Attorney, Agent, or Firm* — Taft Stettinius & Hollister LLP (57) ABSTRACT

An on-premises system for pre-processing data for forecasting according to an embodiment includes at least one processor and at least one memory having a plurality of instructions stored thereon that, in response to execution by the at least one processor, causes the on-premises system to receive a request to forecast contact center data using a cloud system, determine a first number of interactions per unit of time for a source interval, determine a second number of units of time in a destination interval, and determine a third number of interactions in the destination interval based on the first number of interactions per unit of time for the source interval and the second number of units of time in the destination interval.

20 Claims, 7 Drawing Sheets

```
lastInterval : 0
lastTime : statistics.firstItem.Time
for(every item in the statistics)
{
    currentTime : item.Time
    currentInterval : Time difference of currentTime and
    lastTime
    if(currentInterval = 0)
    {
        //1st value - Find the next item and get the next
        interval
        //Use the next interval  to calculate the number of
        interactions per mins and try to calculate the number of
        interactions for the 15 min interval.
        //For example:  First Time : 5:30 - Value : 91 Next Time
        :6:00
        //Next interval = 30mins. So  no. of interactions per
        min based on the interval - 3.03
        //Value = No. of interactions per mins * Timedifference
        in mins or  No. of interactions per sec * Timedifference
        in sec //Value = (Value / intervalInMin) *
        Timedifference in mins  or  No. of interactions per sec
        * Timedifference in sec
        //Value = (91 / 30) * 15
        //For 5:15 to 5:30  - Value - 45.5
        nextTime : statistics.nextItem.Time
        nextInterval : TimeDifference of nextTime and
        currentTime
        valueToBe : (value/nextInterval)* 15 //Value = No. of
        interactions per min based on next interval * 15 mins(as
        we are trying to fill the data for every 15 mins
        interval)
        result[floorCurrentTime] = valueToBe
    }
```

FIG. 4

```
else{
    if(lastInterval not equal to currentInterval)
    {
        while(ceilLastTime < floorCurrentTime)
        {
            //Fill the gaps with -1. Make sure that there is
            no entry for the time in the result map!
            result[ceilLastTime] = -1
            ceilLastTime = NextTimeSeriesEntry of
            ceilLastTime
        }
        // Update the lastTime and currentInterval based on
        the next interval if we have filled gaps using the
        above while loop
        if the while loop has run
        {
            nextTime : Statistics.nextItem.Time
            nextInterval : TimeDifference of nextTime and
            currentTime
            lastTime : adjustTime(currentTime, -
            nextInterval)
            currentInterval : TimeDifference of currentTime
            and  lastTime
        }
    }
    // do while loop takes care of filling data till the
    penultimate round time
    // if lastTime = 6:20 and currentTime = 7:10
    // do while loop fills data for  6:30, 6:45, 7:00
    lastTime1 : lastTime
    ceilLastTime1 : Ceil(lastTime1)
```

FIG. 5

```
do
{
    timeDiff : TimeDifference of ceilLastTime1 and
    lastTime1 valueToBe : (value/currentInterval)*
    timeDiff //Value = No. of interactions per sec *
    Timedifference in sec result[ceilLastTime1] = valueToBe //If value for
    ceilLastTime1 is already found in the result, then
    add the valueToBe to the value against ceilLastTime
    in the result lastTIme1 : ceilLastTime1 ceilLastTime1: NextTimeSeriesEntry of lastTIme1
}while(ceilLastTime1 < ceilCurrentTime)

// Below logic fills data for the 7:15 timeDiff : TimeDifference of currentTime and lastTime1 valueToBe : (value/currentInterval)* timeDiff //Value =
No. of interactions per sec * Timedifference in sec result[ceilLastTime1] = valueToBe //If value for
ceilLastTime1 is already found in the result, then add
the valueToBe to the value against ceilLastTime in the
result
}
lastTime : currentTime
lastInterval : currentInterval
}
```

FIG. 6

```
//The data involved in the forecasting will have an upper
limit for interpolation, which will be indicated as ILimit.
This could be minutes, hours, days, etc.
//The data involved in the forecast will have an interval
length, which will be indicated as ILength. This could be
minutes, hours, days, etc. However, has the restrictions
ILength < ILimit.
//The data specific to our use case utilizes an ILength =
15min and an ILimit = 1hour.
//For our data all buckets are identified at 15-minute
intervals starting at 00 minutes. This implies the buckets are
00, 15, 30, and 45.

Algorithm:
//Input: (1)Data Range (2)Actual data for the desired range
:Identify data start time
:Fill from desired start time to data start time with empty
values //All buckets are backward-facing in time, thus bucket
ILength1 is (ILength0, ILength1]
//For our data bucket 15, is data from (00,15], where the
previous time index is non-inclusive.
:Align the first data point to the first ILength bucket.
//For our data this alignment is at the first 15-minute bucket :For (All of the actual data)
//Backfilling is necessary when data does not break evenly on
the ILength barriers.
//For our data 15min barriers are utilized. For example, data
breaking a barrier spanning from 05 to 23 would fill the
(00,15] and (15,30] buckets
::Fill from the last filled interval to (current data's
interval - ILimit) with zeroes
::Break data over ILength intervals starting with the last
unfilled or partially filled interval and subsequent
interval(s) until the data is exhausted.
```

FIG. 7

SYSTEM AND METHOD FOR IMPROVEMENTS TO PRE-PROCESSING OF DATA FOR FORECASTING

BACKGROUND

Many computing systems that analyze data for forecasting and/or other purposes require data to be segmented into particular intervals (e.g., 15-minute time intervals) and supplied at explicit indexes. However, it is common for the data sources from which the data for analysis is retrieved to process and/or store data that is segmented according to different and/or inconsistent intervals. The data must be pre-processed to coincide with the expected segmentation parameters of the analytical computing system performing the forecasting and/or other processing. Traditionally, the system would "draw a line" in the data to split data spanning multiple expected intervals into the corresponding intervals; however, such approaches are deficient in that the data often falls into the wrong intervals or "buckets."

SUMMARY

One embodiment is directed to a unique system, components, and methods for processing data for forecasting. Other embodiments are directed to apparatuses, systems, devices, hardware, methods, and combinations thereof for processing data for forecasting.

According to an embodiment, an on-premises system for pre-processing data for forecasting may include at least one processor and at least one memory having a plurality of instructions stored thereon that, in response to execution by the at least one processor, causes the on-premises system to receive a request to forecast contact center data using a cloud system, determine a first number of interactions per unit of time for a source interval, determine a second number of units of time in a destination interval, and determine a third number of interactions in the destination interval based on the first number of interactions per unit of time for the source interval and the second number of units of time in the destination interval.

In some embodiments, the on-premises system may further include a contact center system, wherein the contact center system comprises the at least one processor and the at least one memory.

In some embodiments, the first number of interactions may be a number of calls offered to agents of a contact center system.

In some embodiments, the first number of interactions may be a number of calls handled by agents of a contact center system.

In some embodiments, the first number of interactions may be a total handle time of calls by agents of a contact center system.

In some embodiments, to determine the third number of interactions in the destination interval may include to multiple the first number of interactions per unit of time for the source interval by the second number of units of time in the destination interval.

In some embodiments, the destination interval may be a fifteen minute time interval.

In some embodiments, to receive the request to forecast contact center data using the cloud system may include to receive a request to migrate the data from the on-premises system to the cloud system.

According to another embodiment, a system for pre-processing data for forecasting may include an on-premises system configured to receive a request to forecast contact center data from a user device, determine a first number of interactions per unit of time for an input interval, determine a second number of units of time in an output interval, and determine a third number of interactions in the output interval based on the first number of interactions per unit of time for the input interval and the second number of units of time in the output interval, and a cloud system configured to forecast contact center system data based on the third number of interactions in the output interval.

In some embodiments, the first number of interactions may be a number of calls offered to agents of the contact center system.

In some embodiments, the first number of interactions may be a number of calls handled by agents of the contact center system.

In some embodiments, the first number of interactions may be a total handle time of calls by agents of the contact center system.

In some embodiments, to determine the third number of interactions in the output interval may include to multiple the first number of interactions per unit of time for the input interval by the second number of units of time in the output interval.

In some embodiments, the output interval may be a fifteen minute time interval.

According to yet another embodiment, a method of pre-processing data for forecasting may include receiving, by an on-premises contact center system, a request to forecast contact center data using a cloud system, determining, by the on-premises contact center system, a first number of interactions per unit of time for a source interval, determining, by the on-premises contact center system, a second number of units of time in a destination interval, and determining, by the on-premises contact center system, a third number of interactions in the destination interval based on the first number of interactions per unit of time for the source interval and the second number of units of time in the destination interval.

In some embodiments, the first number of interactions may be a number of calls offered to agents of the contact center system.

In some embodiments, the first number of interactions may be a number of calls handled by agents of the contact center system.

In some embodiments, the first number of interactions may be a total handle time of calls by agents of the contact center system.

In some embodiments, determining the third number of interactions in the destination interval may include multiplying the first number of interactions per unit of time for the source interval by the second number of units of time in the destination interval.

In some embodiments, the destination interval may be a fifteen minute time interval.

This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIG. 7 illustrates at least one other embodiment of pseudocode for pre-processing data for forecasting.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should be further appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Further, particular features, structures, or characteristics may be combined in any suitable combinations and/or sub-combinations in various embodiments.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Figure 1:
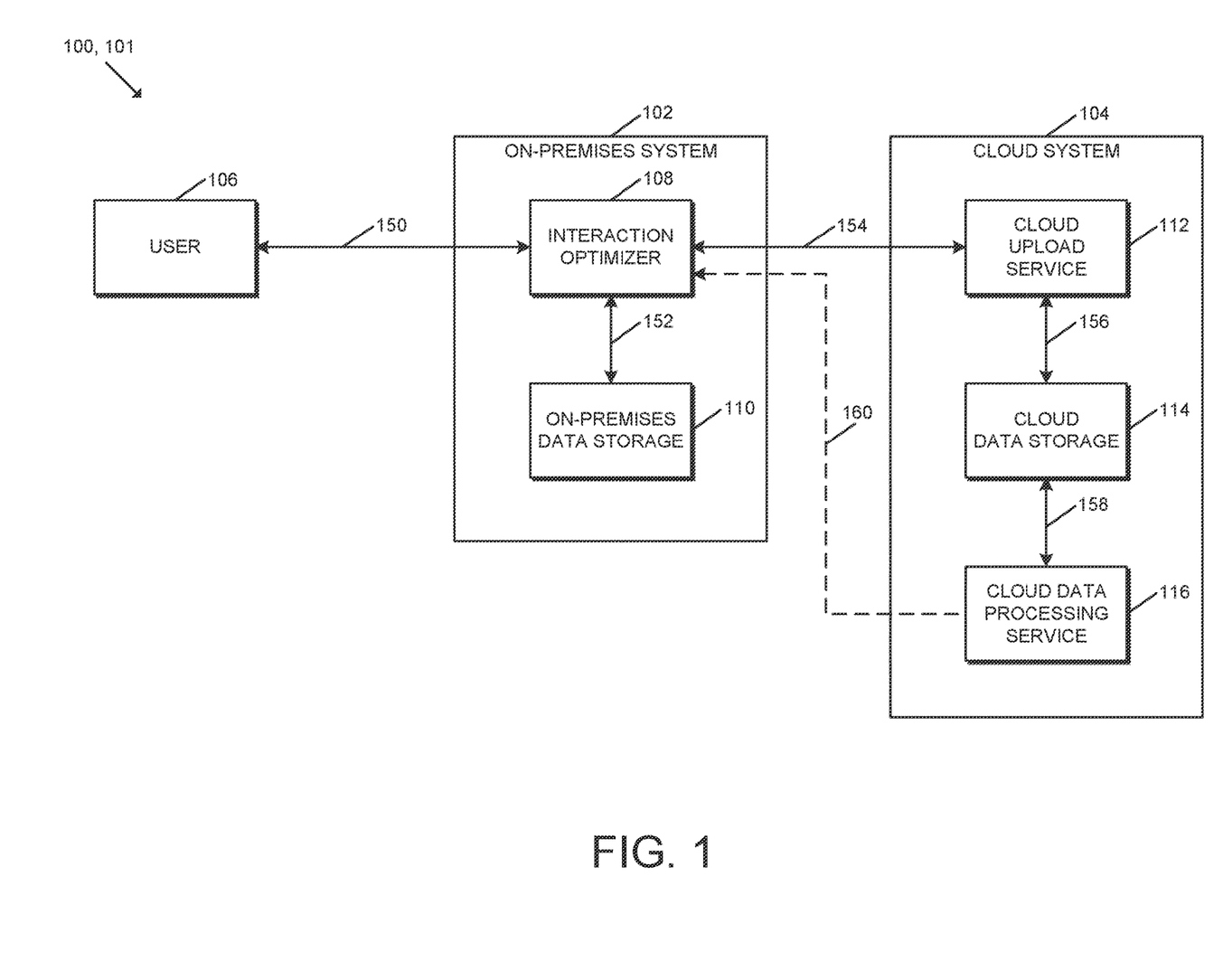
FIG. 1 depicts a simplified system flow diagram of at least one embodiment of a system and method for pre-processing data for forecasting.

Referring now to FIG. 1, a system flow diagram of a system 100 and method 101 for pre-processing data for forecasting is shown. The illustrative system 100 includes an on-premises system 102, a cloud system 104, and a user 106. Additionally, as shown, the illustrative on-premises system 102 includes an interaction optimizer 108 and an on-premises data storage 110, and the illustrative cloud system 104 includes a cloud upload service 112, a cloud data storage 114, and a cloud data processing service 116. Although only one on-premises system 102, one cloud system 104, one user 106, one interaction optimizer 108, one on-premises data storage 110, one cloud upload service 112, one cloud data storage 114, and one cloud data processing service 116 are shown in the illustrative embodiment of FIG. 1, the system 100 may include multiple on-premises systems 102, cloud systems 104, users 106, interaction optimizers 108, on-premises data storages 110, cloud upload services 112, cloud data storages 114, and/or cloud data processing services 116 in other embodiments. For example, in some embodiments, the same cloud system 104 may be used to process data from multiple on-premises systems 102. In some embodiments, one or more of the systems, services, and/or components described herein may be excluded from the system 100, one or more of the systems, services, and/or components described as being independent may form a portion of another system, service, and/or component, and/or one or more features of the systems, services, and/or components may be independent.

Figure 2:
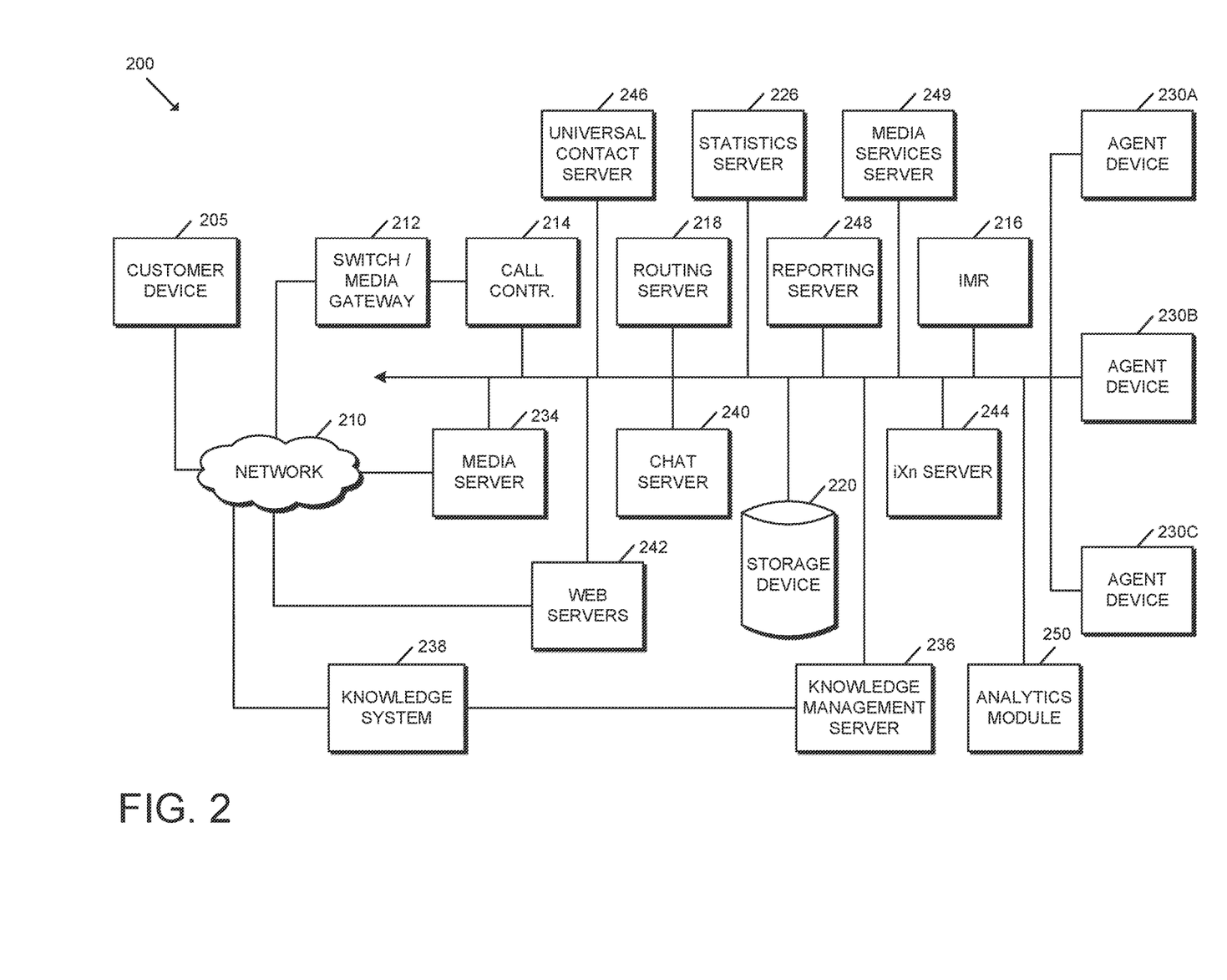
FIG. 2 is a simplified block diagram of at least one embodiment of a call center system.
Figure 3:
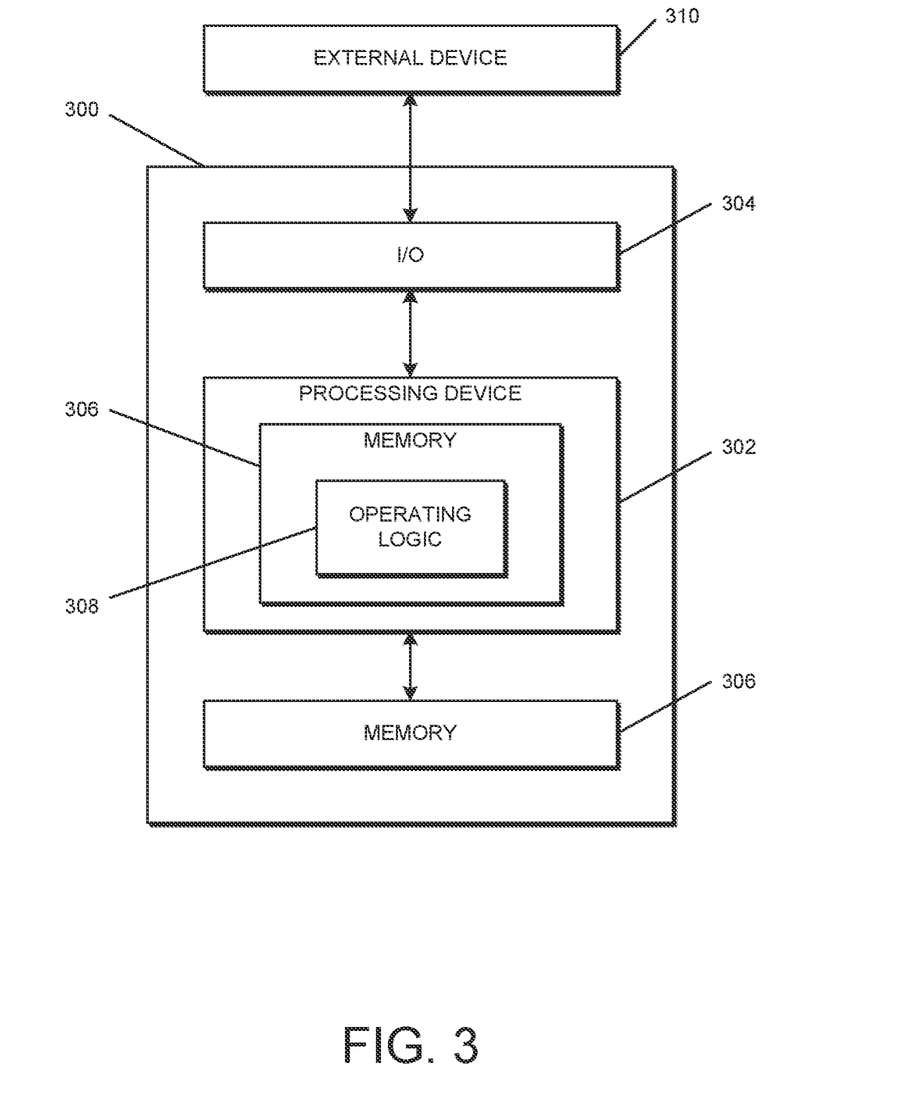
FIG. 3 is a simplified block diagram of at least one embodiment of a computing system.

It should be appreciated that each of the on-premises system 102, the cloud system 104, the user 106 (or more specifically, a user device), the interaction optimizer 108, the on-premises data storage 110, the cloud upload service 112, the cloud data storage 114, and the cloud data processing service 116 may be embodied as, executed by, form a portion of, or associated with any type of device/system, collection of devices/systems, and/or portion(s) thereof suitable for performing the functions described herein (e.g., the computing device 300 of FIG. 3). Further, in some embodiments, the system 100 and/or a portion thereof may be embodied as a cloud-based system as described below. In some embodiments, one or more features of the system 100 may form a portion of or involve a contact center system similar to the contact center system 200 of FIG. 2. For example, in some embodiments, the on-premises system 102 may form a portion of or be communicatively coupled with a contact center system such as the contact center system 200.

Although the on-premises system 102 is described herein as a system local to the customer's computing environment (i.e., on premises), it should be appreciated that a portion of the on-premises system 102 may be remote relative to the customer's computing environment in some embodiments. For example, in some embodiments, the on-premises system 102 may be embodied as a "closed cloud" system deployed for a particular customer. Likewise, although the cloud system 104 is described herein as a cloud-based computing system, the cloud system 104 may include one or more devices/systems positioned outside of a cloud computing environment in other embodiments.

It should be appreciated that the technologies described herein allow for the pre-processing of data for forecasting and/or other processing. For example, as described in greater detail below, the system 100 may collect data from the on-premises system 102 (e.g., associated with the contact center system 200) that is segmented into various intervals (which may be arbitrary for the purposes of the technology described herein) and perform pre-processing of the data in order to segment the data into a predefined set of intervals (e.g., 15 minute intervals) expected by the cloud system 104. The pre-processed data may be transmitted to the cloud system 104 for forecasting and/or other processing. In some embodiments, the data collected and processed may include the number of calls offered to agents (e.g., within the contact center system), the number of calls handled by an agent, the total handle time including after call work (e.g., completing forms associated with the call), the after call time, and/or other data. Further, it should be appreciated that the data may be described as interactions.

In use, the system 100 may execute the method 101 of FIG. 1 for pre-processing data for forecasting. As shown, the illustrative method 101 includes flows 150-160. It should be appreciated that the particular flows of the method 101 are illustrated by way of example, and such blocks may be combined or divided, added or removed, and/or reordered in whole or in part depending on the particular embodiment, unless stated to the contrary.

The illustrative method 101 begins with flow 150 in which the user 106 requests that data be transferred from the on-premises system 102 to the cloud system 104 for forecasting and/or other processing. For example, in some embodiments, the user 106 requests a historical data transfer to preload the cloud system 104 with interaction data, which provides preliminary data for forecasting interaction volumes in the cloud system 104. In some embodiments, the request may occur as a one-time operation (or infrequent operation) in order to request that the on-premises data be transferred to the cloud system 104 for permanent cloud-based operation. For example, in some embodiments, the one-time operation may be performed in conjunction with migrating a customer from an on-premises workforce management system to a cloud-based system. In other embodiments, the user 106 may make the request on-demand via a user interface as many times as desired. For example, in some embodiments, the customer may maintain usage of the on-premises system 102 but leverage the forecasting algorithms of the cloud system 104 via a user interface accessible to the user 106 of the on-premises system 102.

In flow 152, the interaction optimizer 108 of the on-premises system 102 accesses the data stored in the on-premises data storage 110 (e.g., a customer database) and performs the pre-processing for forecasting as described herein. For example, the pseudocode of FIGS. 4-6 describes at least one embodiment of pre-processing data for forecasting, and the pseudocode of FIG. 7 describes at least one other embodiment of pre-processing data for forecasting. As indicated above, in some embodiments, it should be appreciated that the data being read include the number of calls offered to agents (e.g., within the contact center system 200), the number of calls handled by agents (e.g., within the contact center system 200), and the total call handle time by agents including after call work. In other embodiments, the data may include the after call time of agents (e.g., excluding the on-call handle time) and/or other data relevant to call center forecasting.

In the illustrative embodiment, the forecasting algorithms of the cloud system 104 require data to be segmented into 15-minute intervals supplied at explicit hour indexes (e.g., minute intervals of 00, 154, 30, and 45 on the hour). However, as indicated above, the on-premises system 102 may store data in another format (e.g., at the discretion of the customer). Accordingly, the interaction optimizer 108 pre-processes the data to convert the data from the source format (e.g., having intervals of the on-premises system 102) to the 15-minute intervals segmentation of the cloud system 104, and in the illustrative embodiment, the interaction optimizer 108 does so without assuming the source data intervals are consistent over any period. Although the illustrative embodiment involves 15-minute intervals, it should be appreciated that the cloud system 104 may utilize different length intervals in other embodiments.

It should be appreciated that a natural step to performing the pre-processing may be to attempt to average the data over the hour, for example, to generate a homogeneous distribution of data by summing all of the data for the hour and dividing the data into four blocks to match the quarter hour intervals. However, such an approach does not provide the proper granularity of data to the quarter hour intervals. Under examination, theoretical data sets were identified that "broke" the homogeneous distribution and resulted in incorrect forecasts.

Figure 4:
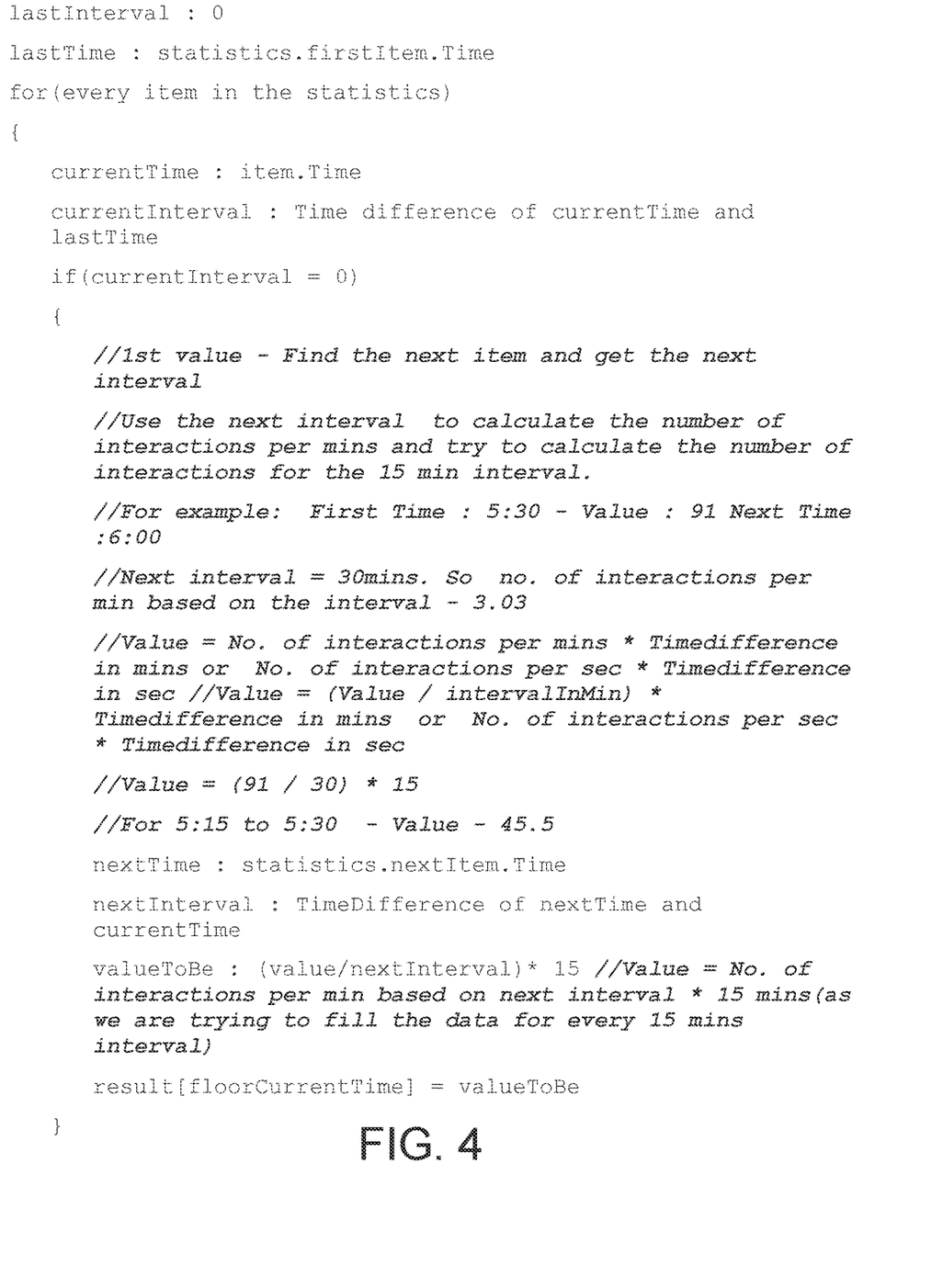
FIGS. 4-6 illustrate at least one embodiment of pseudocode for pre-processing data for forecasting.
Figure 5:
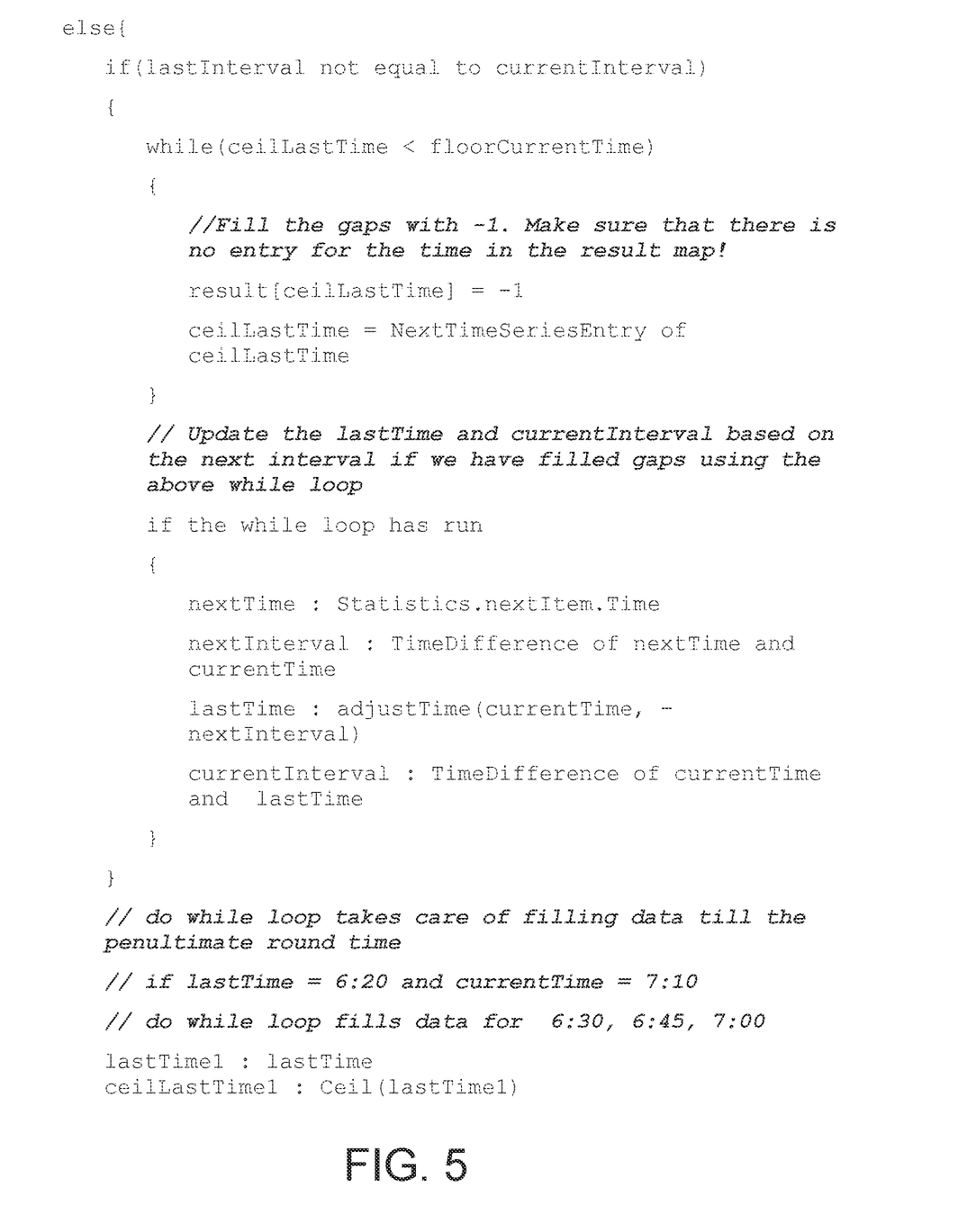
Figure 6:
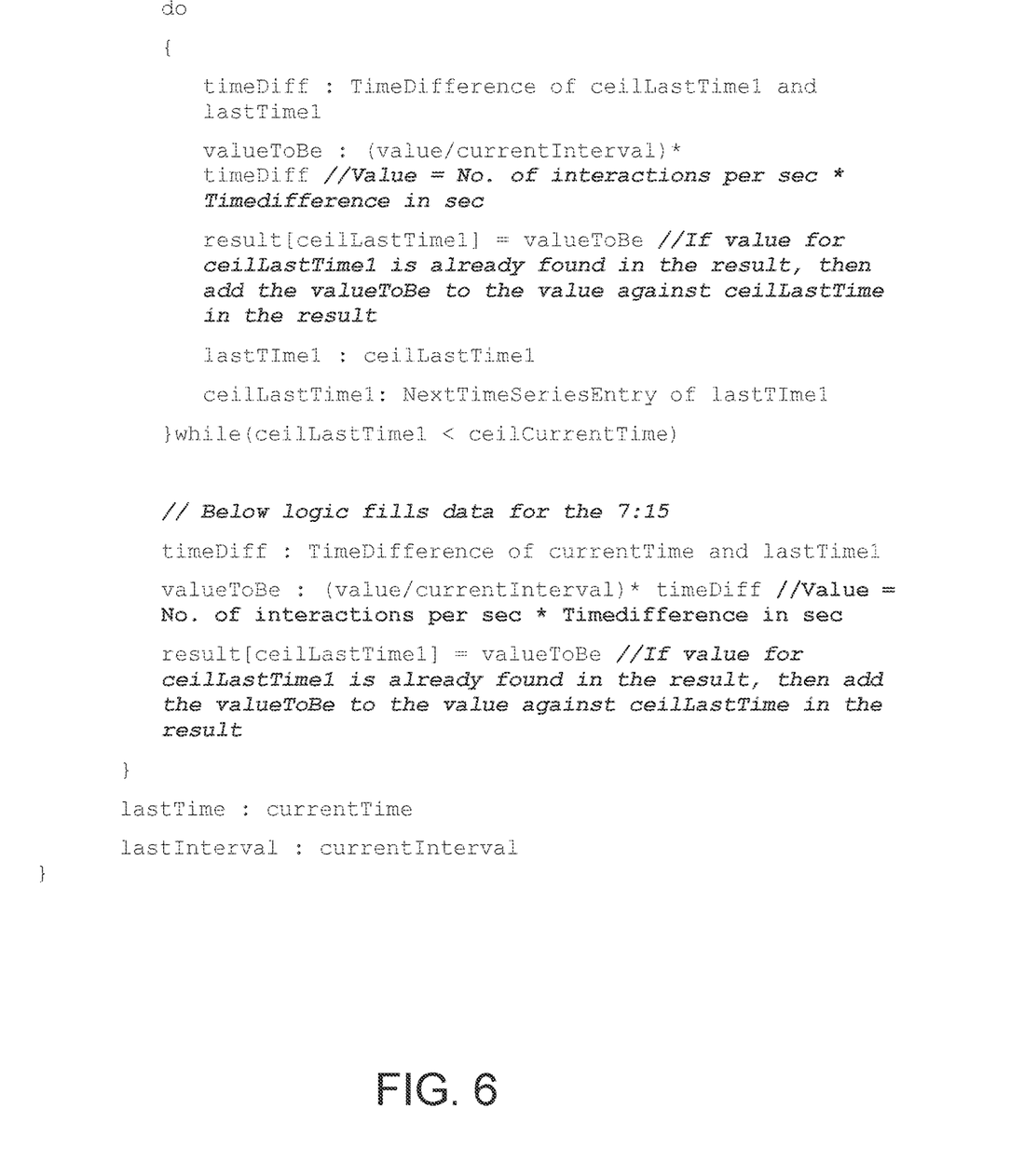

Referring now to FIGS. 4-6, exemplary pseudocode for pre-processing data for forecasting is shown. The illustrative pseudocode includes the code itself and comments describing the functionality of the code, which are depicted in bold text for clarity. In the illustrative embodiment, the pre-processing algorithm essentially involves determining the number of interactions per unit of time for the source/input interval and multiplying that number by the units of time in the destination/output interval. For example, as described in the comments to the pseudocode, the interaction optimizer 108 of the on-premises system 102 may determine the next source/input interval and calculate the number of interactions per minute. Suppose the interval has a first time of 5:30, a next time of 6:00, and a value of 91 (i.e., 91 interactions within that interval). The next interval is calculated as 30 minutes, and the number of interactions per minute based on that interval is 3.03 (91 interactions/30 minutes=3.03). In order to properly apportion the interactions, the interaction optimizer 108 determines the new destination interval (5:15 to 5:30, which is 15 minutes in length) and calculates the apportioned interactions by multiplying the number of interactions per minute (3.03) by the interval length (15 minutes) to get a value of 45.5. The code continues in a similar fashion until every item in the statistics has been analyzed and pre-processed. In other words, the pseudocode is essentially determining where the offsets are and how to put the data into the "buckets." The data being analyzed is aggregate data that has been stored. In some sense, the aggregate data is weighted across the different intervals to determine the appropriate apportionment of the data within the new corresponding intervals. FIG. 7 illustrates at least one other embodiment of pseudocode for pre-processing data for forecasting.

Tables 1-3 depicted below illustrate example data utilized in developing the forecast pre-processing algorithms and techniques described herein. In particular, Table 1 includes sample data. Table 2 includes sample input data against a sorted time series (e.g., with no constraint on the interval of the series). Table 3 includes sample output data to be distributed/smoothened against a specific strict interval of time. As described in the pseudocode of FIGS. 4-6, if there are missing values in the input series, then the output series is populated with −1 for those intervals in the illustrative embodiment.

TABLE 1

Sample Data

| IntervalStartUTC | WorkgroupName | Offered | TalkCompleteACD | ACWComplete | Completed |
|---|---|---|---|---|---|
| 01/01/20 0:05 | workgroup | 10 | 950 | 178 | 8 |
| 01/01/20 0:29 | workgroup | 11 | 1059 | 130 | 12 |
| 01/01/20 0:53 | workgroup | 17 | 1165 | 276 | 18 |
| 01/01/20 01:17 | workgroup | 7 | 550 | 250 | 7 |

TABLE 2

Input Data

| Time Series | Value(nOffered) |
|---|---|
| 01/01/2020 00:05 | 10 |
| 01/01/2020 00:29 | 11 |
| 01/01/2020 00:53 | 17 |
| 01/01/2020 01:17 | 7 |

TABLE 3

Output Data

| Time Series | Value(nOffered) |
|---|---|
| 01/01/2020 00:00 | 6.25 |
| 01/01/2020 00:15 | 6.68 |
| 01/01/2020 00:30 | 7.13 |
| 01/01/2020 00:45 | 10.63 |
| 01/01/2020 01:00 | 7.72 |
| 01/01/2020 01:15 | 4.38 |
| 01/01/2020 01:30 | 1.14 |

Referring back to FIG. 1, in flow 154, the interaction optimizer 108 of the on-premises system 102 transmits the pre-processed data to the cloud upload service 112 of the cloud system 104 for forecasting. In particular, in flow 156, the cloud upload service 112 of the cloud system 104 may store the data to cloud data storage 114 of the cloud system 104 (e.g., for use in future forecasting and/or other processing). In some embodiments, the cloud data storage 114 may include one or more AWS S3 buckets. However, it should be appreciated that the cloud data storage 114 may include other types of cloud-based data storage in other embodiments.

In flow 158, the cloud data processing service 116 of the cloud system 104 may retrieve the data from the cloud data storage 114 and perform forecasting to generate the interactions offered and average handle time. In some embodiments, the forecasting may be performed nightly and/or periodically according to another predefined interval. As indicated above, in other embodiments, the forecasting may be performed on-demand in response to a user 106 request. In some embodiments, in flow 160, the interaction optimizer 108 of the on-premises system 102 may be notified when the processing/forecasting is complete such that the interaction optimizer 108 can retrieve and store the forecast data to the on-premises data storage 110 (e.g., the customer's on-premises database).

It should be appreciated that, in some embodiments, the system 100 may incorporate memory and speed improvements by eliminating intermediary storage of time series data, directly generating time intervals on the fly, and storing the results into the output data structure. Additional speed improvements may be gained by removing redundant iterations over time series data sets. In an exemplary embodiment, memory storage was improved from $O(2n*m)$ to $O(1*m)$, where m is a time interval data set, and speed was improved from $O(\log n*m)$ to $O(1*m)$, where m is a time interval data set. Further, there are significant constant time speed improvements specifically related to the iterations over time series data sets. More specifically, in the less efficient method, the system 100 may take the data from the source on the on-premises system 102, copy the data into a data structure on the on-premises system 102 (e.g., in the on-premises data storage 110), and copy the data into a final data structure for uploading to the cloud upload service 112. In the memory-efficient method, the intermediate data structure may be omitted such that the data is transmitted from the source to an output data structure that is uploaded.

Although the flows 150-160 are described in a relatively serial manner, it should be appreciated that various blocks of the method 101 may be performed in parallel in some embodiments.

Referring now to FIG. 2, a simplified block diagram of at least one embodiment of a communications infrastructure and/or content center system, which may be used in conjunction with one or more of the embodiments described herein, is shown. The contact center system 200 may be embodied as any system capable of providing contact center services (e.g., call center services, chat center services, SMS center services, etc.) to an end user and otherwise performing the functions described herein. The illustrative contact center system 200 includes a customer device 205, a network 210, a switch/media gateway 212, a call controller 214, an interactive media response (IMR) server 216, a routing server 218, a storage device 220, a statistics server 226, agent devices 230A, 230B, 230C, a media server 234, a knowledge management server 236, a knowledge system 238, chat server 240, web servers 242, an interaction (iXn) server 244, a universal contact server 246, a reporting server 248, a media services server 249, and an analytics module 250. Although only one customer device 205, one network 210, one switch/media gateway 212, one call controller 214, one IMR server 216, one routing server 218, one storage device 220, one statistics server 226, one media server 234, one knowledge management server 236, one knowledge system 238, one chat server 240, one iXn server 244, one universal contact server 246, one reporting server 248, one media services server 249, and one analytics module 250 are shown in the illustrative embodiment of FIG. 2, the contact center system 200 may include multiple customer devices 205, networks 210, switch/media gateways 212, call controllers 214, IMR servers 216, routing servers 218, storage devices 220, statistics servers 226, media servers 234, knowledge management servers 236, knowledge systems 238, chat servers 240, iXn servers 244, universal contact servers 246, reporting servers 248, media services servers 249, and/or analytics modules 250 in other embodiments. Further, in some embodiments, one or more of the components described herein may be excluded from the system 200, one or more of the components described as being independent may form a portion of another component, and/or one or more of the component described as forming a portion of another component may be independent.

It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers may offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, and/or other communication channels.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and/or other automated processed. In many cases, this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

It should be appreciated that the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another embodiment, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein and further described below in reference to the computing device 300, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

It should be understood that any of the computer-implemented components, modules, or servers described in relation to FIG. 2 may be implemented via one or more types of computing devices, such as, for example, the computing device 300 of FIG. 3. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and/or other characteristics.

Customers desiring to receive services from the contact center system 200 may initiate inbound communications (e.g., telephone calls, emails, chats, etc.) to the contact center system 200 via a customer device 205. While FIG. 2 shows one such customer device—i.e., customer devices 205—it should be understood that any number of customer devices 205 may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of the network typically depending on the type of customer device being used and the form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

The switch/media gateway 212 may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 212 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, and/or other types of calls. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

The interactive media response (IMR) server 216 may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may instruct customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource. The IMR configuration may be performed through the use of a self-service and/or assisted service tool which comprises a web-based tool for developing IVR applications and routing applications running in the contact center environment (e.g. Genesys® Designer).

The routing server 218 may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described herein, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

It should be appreciated that the contact center system 200 may include one or more mass storage devices—represented generally by the storage device 220—for storing data in one or more databases relevant to the functioning of the contact center. For example, the storage device 220 may store customer data that is maintained in a customer database. Such customer data may include, for example, customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database. Agent data maintained by the contact center system 200 may include, for example, agent availability and agent profiles, schedules, skills, handle time, and/or other relevant data. As another example, the storage device 220 may store interaction data in an interaction database. Interaction data may include, for example, data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therein or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

The statistics server 226 may be configured to record and aggregate data relating to the performance and operational aspects of the contact center system 200. Such information may be compiled by the statistics server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center system 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. Although FIG. 2 shows three such agent devices 230—i.e., agent devices 230A, 230B and 230C—it should be understood that any number of agent devices 230 may be present in a particular embodiment.

The multimedia/social media server 234 may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 236 may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials. As an example, the knowledge system 238 may be embodied as IBM Watson or a similar system.

The chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage, and facilitate user interfaces (UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 236 and the knowledge systems 238 for receiving suggestions and answers to queries posed by customers during a chat so that, for example, links to relevant articles can be provided.

The web servers 242 may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

The interaction (iXn) server 244 may be configured to manage deferrable activities of the contact center and the routing thereof to human agents for completion. As used herein, deferrable activities may include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferrable activities. Once assigned to a particular agent, the deferrable activity is pushed to that agent so that it appears on the agent device 230 of the selected agent. The deferrable activity may appear in a workbin as a task for the selected agent to complete. The functionality of the workbin may be implemented via any conventional data structure, such as, for example, a linked list, array, and/or other suitable data structure. Each of the agent devices 230 may include a workbin. As an example, a workbin may be maintained in the buffer memory of the corresponding agent device 230.

The universal contact server (UCS) 246 may be configured to retrieve information stored in the customer database and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, and/or agent occupancy. The reports may be generated automatically or in response to specific requests from a requestor (e.g., agent, administrator, contact center application, etc.). The reports then may be used toward managing the contact center operations in accordance with functionality described herein.

The media services server 249 may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and/or other relevant features.

The analytics module 250 may be configured to provide systems and methods for performing analytics on data received from a plurality of different data sources as functionality described herein may require. In accordance with example embodiments, the analytics module 250 also may generate, update, train, and modify predictors or models based on collected data, such as, for example, customer data, agent data, and interaction data. The models may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module is described as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database and agent database. The analytics module 250 also may have access to the interaction database, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, the analytic module 250 may be configured to retrieve data stored within the storage device 220 for use in developing and training algorithms and models, for example, by applying machine learning techniques.

One or more of the included models may be configured to predict customer or agent behavior and/or aspects related to contact center operation and performance. Further, one or more of the models may be used in natural language processing and, for example, include intent recognition and the like. The models may be developed based upon known first principle equations describing a system; data, resulting in an empirical model; or a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, in some embodiments, it may be preferable that the models are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach may be a preferred embodiment for implementing the models. Neural networks, for example, may be developed based upon empirical data using advanced regression algorithms.

The analytics module 250 may further include an optimizer. As will be appreciated, an optimizer may be used to minimize a "cost function" subject to a set of constraints, where the cost function is a mathematical representation of desired objectives or system operation. Because the models may be non-linear, the optimizer may be a nonlinear programming optimizer. It is contemplated, however, that the technologies described herein may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like.

According to some embodiments, the models and the optimizer may together be used within an optimization system. For example, the analytics module 250 may utilize the optimization system as part of an optimization process by which aspects of contact center performance and operation are optimized or, at least, enhanced. This, for example, may include features related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment. It should be appreciated that each of the devices of the call center system 200 may be embodied as, include, or form a portion of one or more computing devices similar to the computing device 300 described below in reference to FIG. 3.

Referring now to FIG. 3, a simplified block diagram of at least one embodiment of a computing device 300 is shown. The illustrative computing device 300 depicts at least one embodiment of each of the computing devices, systems, servicers, controllers, switches, gateways, engines, modules, and/or computing components described herein (e.g., which collectively may be referred to interchangeably as computing devices, servers, or modules for brevity of the description). For example, the various computing devices may be a process or thread running on one or more processors of one or more computing devices 300, which may be executing computer program instructions and interacting with other system modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described herein—such as the contact center system 200 of FIG. 2—the various servers and computer devices thereof may be located on local computing devices 300 (e.g., on-site at the same physical location as the agents of the contact center), remote computing devices 300 (e.g., off-site or in a cloud-based or cloud computing environment, for example, in a remote data center connected via a network), or some combination thereof. In some embodiments, functionality provided by servers located on computing devices off-site may be accessed and provided over a virtual private network (VPN), as if such servers were on-site, or the functionality may be provided using a software as a service (SaaS) accessed over the Internet using various protocols, such as by exchanging data via extensible markup language (XML), JSON, and/or the functionality may be otherwise accessed/leveraged.

In some embodiments, the computing device 300 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, and/or any other computing, processing, and/or communication device capable of performing the functions described herein.

The computing device 300 includes a processing device 302 that executes algorithms and/or processes data in accordance with operating logic 308, an input/output device 304 that enables communication between the computing device 300 and one or more external devices 310, and memory 306 which stores, for example, data received from the external device 310 via the input/output device 304.

The input/output device 304 allows the computing device 300 to communicate with the external device 310. For example, the input/output device 304 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 300 may be configured to use any one or more communication technologies (e.g., wireless or wired communications) and associated protocols (e.g., Ethernet, Bluetooth®, WiMAX, etc.) to effect such communication depending on the particular computing device 300. The input/output device 304 may include hardware, software, and/or firmware suitable for performing the techniques described herein.

The external device 310 may be any type of device that allows data to be inputted or outputted from the computing device 300. For example, in various embodiments, the external device 310 may be embodied as one or more of the devices/systems described herein, and/or a portion thereof. Further, in some embodiments, the external device 310 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 310 may be integrated into the computing device 300.

The processing device 302 may be embodied as any type of processor(s) capable of performing the functions described herein. In particular, the processing device 302 may be embodied as one or more single or multi-core processors, microcontrollers, or other processor or processing/controlling circuits. For example, in some embodiments, the processing device 302 may include or be embodied as an arithmetic logic unit (ALU), central processing unit (CPU), digital signal processor (DSP), graphics processing unit (GPU), field-programmable gate array (FPGA), application-specific integrated circuit (ASIC), and/or another suitable processor(s). The processing device 302 may be a programmable type, a dedicated hardwired state machine, or a combination thereof. Processing devices 302 with multiple processing units may utilize distributed, pipelined, and/or parallel processing in various embodiments. Further, the processing device 302 may be dedicated to performance of just the operations described herein, or may be utilized in one or more additional applications. In the illustrative embodiment, the processing device 302 is programmable and executes algorithms and/or processes data in accordance with operating logic 308 as defined by programming instructions (such as software or firmware) stored in memory 306. Additionally or alternatively, the operating logic 308 for processing device 302 may be at least partially defined by hardwired logic or other hardware. Further, the processing device 302 may include one or more components of any type suitable to process the signals received from input/output device 304 or from other components or devices and to provide desired output signals. Such components may include digital circuitry, analog circuitry, or a combination thereof.

The memory 306 may be of one or more types of non-transitory computer-readable media, such as a solid-state memory, electromagnetic memory, optical memory, or a combination thereof. Furthermore, the memory 306 may be volatile and/or nonvolatile and, in some embodiments, some or all of the memory 306 may be of a portable type, such as a disk, tape, memory stick, cartridge, and/or other suitable portable memory. In operation, the memory 306 may store various data and software used during operation of the computing device 300 such as operating systems, applications, programs, libraries, and drivers. It should be appreciated that the memory 306 may store data that is manipulated by the operating logic 308 of processing device 302, such as, for example, data representative of signals received from and/or sent to the input/output device 304 in addition to or in lieu of storing programming instructions defining operating logic 308. As shown in FIG. 3, the memory 306 may be included with the processing device 302 and/or coupled to the processing device 302 depending on the particular embodiment. For example, in some embodiments, the processing device 302, the memory 306, and/or other components of the computing device 300 may form a portion of a system-on-a-chip (SoC) and be incorporated on a single integrated circuit chip.

In some embodiments, various components of the computing device 300 (e.g., the processing device 302 and the memory 306) may be communicatively coupled via an input/output subsystem, which may be embodied as circuitry and/or components to facilitate input/output operations with the processing device 302, the memory 306, and other components of the computing device 300. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 300 may include other or additional components, such as those commonly found in a typical computing device (e.g., various input/output devices and/or other components), in other embodiments. It should be further appreciated that one or more of the components of the computing device 300 described herein may be distributed across multiple computing devices. In other words, the techniques described herein may be employed by a computing system that includes one or more computing devices. Additionally, although only a single processing device 302, I/O device 304, and memory 306 are illustratively shown in FIG. 3, it should be appreciated that a particular computing device 300 may include multiple processing devices 302, I/O devices 304, and/or memories 306 in other embodiments. Further, in some embodiments, more than one external device 310 may be in communication with the computing device 300.

The computing device 300 may be one of a plurality of devices connected by a network or connected to other systems/resources via a network. The network may be embodied as any one or more types of communication networks that are capable of facilitating communication between the various devices communicatively connected via the network. As such, the network may include one or more networks, routers, switches, access points, hubs, computers, client devices, endpoints, nodes, and/or other intervening network devices. For example, the network may be embodied as or otherwise include one or more cellular networks, telephone networks, local or wide area networks, publicly available global networks (e.g., the Internet), ad hoc networks, short-range communication links, or a combination thereof. In some embodiments, the network may include a circuit-switched voice or data network, a packet-switched voice or data network, and/or any other network able to carry voice and/or data. In particular, in some embodiments, the network may include Internet Protocol (IP)-based and/or asynchronous transfer mode (ATM)-based networks. In some embodiments, the network may handle voice traffic (e.g., via a Voice over IP (VOIP) network), web traffic, and/or other network traffic depending on the particular embodiment and/or devices of the system in communication with one another. In various embodiments, the network may include analog or digital wired and wireless networks (e.g., IEEE 802.11 networks, Public Switched Telephone Network (PSTN), Integrated Services Digital Network (ISDN), and Digital Subscriber Line (xDSL)), Third Generation (3G) mobile telecommunications networks, Fourth Generation (4G) mobile telecommunications networks, Fifth Generation (5G) mobile telecommunications networks, a wired Ethernet network, a private network (e.g., such as an intranet), radio, television, cable, satellite, and/or any other delivery or tunneling mechanism for carrying data, or any appropriate combination of such networks. It should be appreciated that the various devices/systems may communicate with one another via different networks depending on the source and/or destination devices/systems.

It should be appreciated that the computing device 300 may communicate with other computing devices 300 via any type of gateway or tunneling protocol such as secure socket layer or transport layer security. The network interface may include a built-in network adapter, such as a network interface card, suitable for interfacing the computing device to any type of network capable of performing the operations described herein. Further, the network environment may be a virtual network environment where the various network components are virtualized. For example, the various machines may be virtual machines implemented as a software-based computer running on a physical machine. The virtual machines may share the same operating system, or, in other embodiments, different operating system may be run on each virtual machine instance. For example, a "hypervisor" type of virtualizing is used where multiple virtual machines run on the same host physical machine, each acting as if it has its own dedicated box. Other types of virtualization may be employed in other embodiments, such as, for example, the network (e.g., via software defined networking) or functions (e.g., via network functions virtualization).

Accordingly, one or more of the computing devices 300 described herein may be embodied as, or form a portion of, one or more cloud-based systems. In cloud-based embodiments, the cloud-based system may be embodied as a server-ambiguous computing solution, for example, that executes a plurality of instructions on-demand, contains logic to execute instructions only when prompted by a particular activity/trigger, and does not consume computing resources when not in use. That is, system may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system described herein. For example, when an event occurs (e.g., data is transferred to the system for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of data is made by a user (e.g., via an appropriate user interface to the system), the appropriate virtual function(s) may be executed to perform the actions before eliminating the instance of the virtual function(s).

What is claimed is:

1. An on-premises system for pre-processing data for forecasting, the on-premises system comprising:
   an on-premises data storage having stored thereon contact center interaction data in a source data structure;
   at least one processor; and
   at least one memory having a plurality of instructions stored thereon that, in response to execution by the at least one processor, causes the on-premises system to:
      receive a request to forecast the contact center interaction data using a cloud system;
      determine a corresponding first number of interactions per unit of time for a corresponding source interval of the contact center interaction data for each source interval represented in the source data structure;
      determine a corresponding second number of units of time in a corresponding destination interval represented in an output data structure of the cloud system;
      determine a corresponding third number of interactions in the corresponding destination interval based on the corresponding first number of interactions per unit of time for the corresponding source interval and the corresponding second number of units of time in the corresponding destination interval for each source interval represented in the source data structure to generate the output data structure without use of a third data structure intermediate to the source data structure and the output data structure; and
      upload the output data structure to the cloud system for forecasting.

2. The on-premises system of claim 1, further comprising a contact center system; and
   wherein the contact center system comprises the at least one processor and the at least one memory.

3. The on-premises system of claim 1, wherein the corresponding first number of interactions comprises a number of calls offered to agents of a contact center system.

4. The on-premises system of claim 1, wherein the corresponding first number of interactions comprises a number of calls handled by agents of a contact center system.

5. The on-premises system of claim 1, wherein the corresponding first number of interactions comprises a total handle time of calls by agents of a contact center system.

6. The on-premises system of claim 1, wherein to determine the corresponding third number of interactions in the destination interval comprises to multiply the corresponding first number of interactions per unit of time for the corresponding source interval by the corresponding second number of units of time in the corresponding destination interval.

7. The on-premises system of claim 1, wherein the corresponding destination interval is a fifteen minute time interval.

8. The on-premises system of claim 1, wherein to receive the request to forecast contact center interaction data using the cloud system comprises to receive a request to migrate the contact center interaction data from the on-premises system to the cloud system.

9. A system for pre-processing data for forecasting, the system comprising:
   an on-premises contact center system comprising an on-premises data storage having stored thereon contact center interaction data in a source data structure, the on-premises contact center system configured to (i) receive a request to forecast the contact center interaction data from a user device, (ii) determine a corresponding first number of interactions per unit of time for corresponding source interval of the contact center interaction data for each source interval represented in the source data structure, (iii) determine a corresponding second number of units of time in a corresponding output interval represented in an output data structure, and (iv) determine a corresponding third number of interactions in the corresponding output interval based on the corresponding first number of interactions per unit of time for the corresponding source interval and the corresponding second number of units of time in the corresponding output interval for each source interval represented in the source data structure to generate the output data structure without use of a third data structure intermediate to the source data structure and the output data structure; and
   a cloud-based computing system configured to (i) receive the output data structure from the on-premises contact center system and (ii) forecast contact center system interaction data based on the output data structure.

10. The system of claim 9, wherein the first corresponding number of interactions comprises a number of calls offered to agents of the contact center system.

11. The system of claim 9, wherein the corresponding first number of interactions comprises a number of calls handled by agents of the contact center system.

12. The system of claim 9, wherein the corresponding first number of interactions comprises a total handle time of calls by agents of the contact center system.

13. The system of claim 9, wherein to determine the corresponding third number of interactions in the corresponding output interval comprises to multiply the corresponding first number of interactions per unit of time for the corresponding source interval by the corresponding second number of units of time in the corresponding output interval.

14. The system of claim 9, wherein the corresponding output interval is a fifteen minute time interval.

15. A method of pre-processing data for forecasting, the method comprising:

receiving, by an on-premises contact center system, a request to forecast contact center interaction data of a source data structure stored in an on-premises data storage of the on-premises contact center system using a cloud system;

determining, by the on-premises contact center system, a corresponding first number of interactions per unit of time for a corresponding source interval of the contact center interaction data for each source interval represented in the source data structure;

determining, by the on-premises contact center system, a corresponding second number of units of time in a corresponding destination interval represented in an output data structure of the cloud system; and determining, by the on-premises contact center system, a corresponding third number of interactions in the corresponding destination interval based on the corresponding first number of interactions per unit of time for the corresponding source interval and the corresponding second number of units of time in the corresponding destination interval for each source interval represented in the source data structure to generate the output data structure without use of a third data structure intermediate to the source data structure and the output data structure; and uploading, by the on-premises contact center system, the output data structure to the cloud system for forecasting.

16. The method of claim 15, wherein the corresponding first number of interactions comprises a number of calls offered to agents of the contact center system.

17. The method of claim 15, wherein the corresponding first number of interactions comprises a number of calls handled by agents of the contact center system.

18. The method of claim 15, wherein the corresponding first number of interactions comprises a total handle time of calls by agents of the contact center system.

19. The method of claim 15, wherein determining the corresponding third number of interactions in the corresponding destination interval comprises multiplying the corresponding first number of interactions per unit of time for the corresponding source interval by the corresponding second number of units of time in the corresponding destination interval.

20. The method of claim 15, wherein the corresponding destination interval is a fifteen minute time interval.

* * * * *